United States Patent
Lee et al.

(10) Patent No.: US 12,084,127 B2
(45) Date of Patent: Sep. 10, 2024

(54) STEERING SYSTEM AND METHOD FOR CONTROLLING THE SAME

(71) Applicant: HL MANDO Corporation, Pyeongtaek (KR)

(72) Inventors: Du Han Lee, Yongin (KR); Su-Min Lee, Siheung (KR)

(73) Assignee: HL MANDO CORPORATION, Pyeongtaek (KR)

( * ) Notice: Subject to any disclaimer, the term of this patent is extended or adjusted under 35 U.S.C. 154(b) by 0 days.

(21) Appl. No.: 18/513,682

(22) Filed: Nov. 20, 2023

(65) Prior Publication Data

US 2024/0083495 A1    Mar. 14, 2024

Related U.S. Application Data

(62) Division of application No. 17/228,724, filed on Apr. 13, 2021, now Pat. No. 11,904,960.

(30) Foreign Application Priority Data

Apr. 14, 2020  (KR) .................. 10-2020-0045574
Jan. 14, 2021  (KR) .................. 10-2021-0005504

(51) Int. Cl.
  *B62D 5/00*    (2006.01)
  *B62D 1/181*   (2006.01)
  *B62D 1/187*   (2006.01)
  *B62D 5/04*    (2006.01)

(52) U.S. Cl.
  CPC .......... *B62D 5/0493* (2013.01); *B62D 1/181* (2013.01); *B62D 1/187* (2013.01); *B62D 5/003* (2013.01); *B62D 5/0484* (2013.01)

(58) Field of Classification Search
  None
  See application file for complete search history.

(56) References Cited

U.S. PATENT DOCUMENTS

| | | | |
|---|---|---|---|
| 2013/0320905 A1* | 12/2013 | Uryu ..................... | H02K 11/20 318/490 |
| 2019/0176877 A1* | 6/2019 | Sugure ................. | B62D 5/0463 |
| 2020/0114964 A1* | 4/2020 | Kim ..................... | B60W 10/20 |
| 2020/0114967 A1 | 4/2020 | Nakajima | |
| 2020/0247465 A1* | 8/2020 | Nakamura ........... | B62D 5/0487 |
| 2021/0016824 A1 | 1/2021 | Ishige | |
| 2021/0046973 A1 | 2/2021 | Koseki | |
| 2021/0053615 A1 | 2/2021 | Kondo | |
| 2021/0129855 A1 | 5/2021 | Nakao | |
| 2021/0221428 A1 | 7/2021 | Kudanowski | |
| 2022/0001916 A1 | 1/2022 | Kimura | |

(Continued)

*Primary Examiner* — James M McPherson
(74) *Attorney, Agent, or Firm* — Harvest IP Law, LLC

(57) ABSTRACT

The disclosure relates to a steering system and a method for controlling the same. According to an embodiment, a steering system comprises an electric power steering (EPS) steering motor connected to a first inverter and a second inverter, an additional motor connected to the second inverter and providing a steering-related additional function, a main electric control unit (ECU) including the first inverter and controlling the EPS steering motor through the first inverter, and a sub ECU including the second inverter and controlling at least one of the EPS steering motor or the additional motor based on at least one of main ECU state information or vehicle driving state information.

15 Claims, 12 Drawing Sheets

(56) References Cited

U.S. PATENT DOCUMENTS

| | | |
|---|---|---|
| 2022/0185366 A1* | 6/2022 | Kim .................... B62D 5/0484 |
| 2022/0258794 A1 | 8/2022 | Takesaki |
| 2023/0081701 A1 | 3/2023 | Sato |
| 2023/0109098 A1* | 4/2023 | Terashima ........... B62D 5/0478 |
| | | 701/41 |

* cited by examiner

STEERING SYSTEM AND METHOD FOR CONTROLLING THE SAME

CROSS-REFERENCE TO RELATED APPLICATION

This is a divisional application of U.S. application Ser. No. 17/228,724 filed on Apr. 13, 2021 which claims priority to Korean Patent Application Nos. 10-2020-0045574, filed on Apr. 14, 2020, and 10-2021-0005504, filed on Jan. 14, 2021, which are hereby incorporated by reference for all purposes as if fully set forth herein.

FIELD

Background

The disclosure relates to a steering system and a method for controlling the same. Specifically, the disclosure relates to a steering system for dynamically controlling an electric power steering (EPS) steering motor providing steering torque and an additional motor providing additional functions related to steering and a method for controlling the steering system.

Description of Related Art

A steering device is used as a device for controlling the traveling direction of a vehicle. Recently in wide use are electric power steering (hereinafter, 'EPS') devices that provide steering power required for the steering motor through electronic control have been widely used.

The EPS steering device operates to rotate the steering column or move the rack bar connected thereto by driving the EPS steering motor according to the steering torque applied to the steering wheel by the driver. To that end, the EPS steering device includes an EPS steering motor and a steering electronic control unit (ECU) that controls the steering motor. A certain decelerator is connected to the steering motor, and the decelerator operates in conjunction with the steering column or rack bar.

Meanwhile, there may further be provided a device for adjusting the position of the steering wheel according to the size or position of the driver's body. Specifically, there may be used a steering wheel tilt device that adjusts the height of the steering wheel (i.e., vertical position) by adjusting the inclination of the steering column to which the steering wheel is connected and a telescopic device that adjusts the front and rear positions of the steering wheel by adjusting the length of the steering column.

Such a steering wheel tilt device may include a tilt motor and a tilt control ECU. The steering wheel telescopic device may include a separate telescopic motor and a telescopic control ECU. Various functions, such as the steering tilt function, the steering telescopic function, and other functions, e.g., a steering wheel hide function, may be referred to as steering-related additional functions.

As described above, to provide the steering function and the steering-related additional functions, it is needed to provide a plurality of motors and a separate ECU for controlling each motor.

In autonomous vehicles which are actively under development in recent years, the vehicle controller generates steering commands on its own to operate the steering device regardless of the driver's willingness to steer. The above-described EPS steering device, even when a failure occurs, may perform the basic steering function as it is mechanically connected with the steering column and the rack bar. On the other hand, since the steering system of the autonomous vehicle may not have the driver's intervention, if a failure occurs in the steering system, particularly the ECU of the steering device, steering control may be impossible, resulting in a significant risk. For this reason, recent steering systems require a scheme for ensuring redundancy in case of a failure in the steering ECU.

Thus, a need arises for simplifying multiple ECU structures used in the basic steering device and additional steering devices providing steering-related additional functions, as well as for ensuring fail safe or redundancy in the basic steering device of the vehicle.

BRIEF SUMMARY

To address the foregoing issues, according to embodiments, there is provided a method and device for efficiently controlling a steering motor to control the EPS steering device of the vehicle and an additional motor to provide additional functions.

According to an embodiment, there may be provided a steering system, comprising: an electric power steering (EPS) steering motor connected to a first inverter and a second inverter, an additional motor connected to the second inverter and providing a steering-related additional function, a main electric control unit (ECU) including the first inverter and controlling the EPS steering motor through the first inverter, and a sub ECU including the second inverter and controlling at least one of the EPS steering motor or the additional motor based on at least one of main ECU state information or vehicle driving state information.

According to an embodiment, there may be provided a method for controlling a steering system controlling an EPS steering motor and an additional motor providing a steering-related additional function, comprising controlling the EPS steering motor through a first inverter and transmitting main ECU state information by a main ECU including the first inverter, monitoring the main ECU state information and a control signal for the additional motor by a sub ECU including a second inverter, and controlling, by the sub ECU, the additional motor through the second inverter based on at least one of the main ECU state information or vehicle driving state information if the control signal for the additional motor is input.

According to an embodiment, there may be provided a steering system comprising an EPS steering motor connected to a first inverter and a second inverter, an additional motor connected to the first inverter and the second inverter and providing a steering-related additional function, a main ECU including the first inverter and controlling the EPS steering motor and the additional motor through the first inverter, and a sub ECU including the second inverter and controlling the EPS steering motor and the additional motor through the second inverter, wherein the EPS steering motor alone or the additional motor alone is controlled according to a preset condition.

According to the embodiments of the disclosure, it is possible to efficiently and stably control an EPS steering device and an additional motor that provides additional functions.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
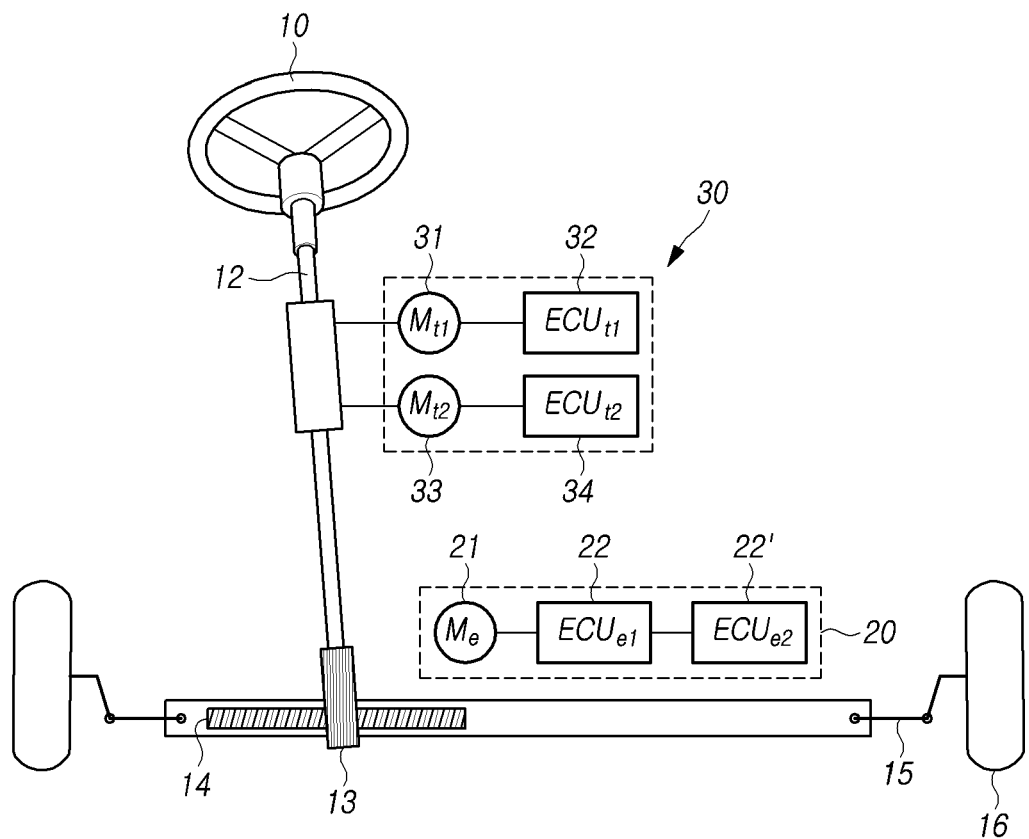
FIG. 1 is a view schematically illustrating a structure of an overall system related to vehicle steering according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

Hereinafter, embodiments of the disclosure are described in detail with reference to the accompanying drawings.

FIG. 1 is a view schematically illustrating a structure of an overall system related to vehicle steering according to an embodiment.

Referring to FIG. 1, the overall vehicle steering-related system includes a steering wheel 10, a steering column 12 connected to the steering wheel 10, and a steering column assembly having a pinion gear 13 formed at an end of the steering column 12.

The overall vehicle steering-related system further includes a rack bar 14 having a rack gear that is gear-coupled to the pinion gear of the steering column. Left and right wheels 16 are connected to the left and right sides of the rack bar 14 via tie rods 15. If the driver rotates the steering wheel and the steering column, the gear structure connected thereto moves the rack bar to the left and right, and accordingly, the wheels are redirected, performing steering.

The EPS steering device includes an EPS steering motor (Me) 21 to assist the driver in steering. The EPS steering motor 21 provides auxiliary steering force that rotates the steering column or moves the rack bar through a certain gear decelerating structure (not shown). One or more steering ECUs may be used to control the driving of the EPS steering motor 21. For example, a first steering ECU ($ECU_{e1}$) 22 may control the EPS steering motor as default.

The EPS steering system may perform basic steering functions because the steering column 13 and the rack bar 14 are mechanically connected even when a failure occurs. However, in the steering system of an autonomous vehicle, since there may be no intervention by the driver, if a failure occurs in the steering system, particularly in the ECU of the steering device, steering control may become impossible, putting it at significant risk.

For this reason, recent steering systems require a scheme for ensuring redundancy in case of a failure in the steering ECU and, to that end, the steering ECU 20 may further include a second steering ECU ($ECU_{e2}$) 22' as a redundancy structure for the first steering ECU ($ECU_{e1}$) 22.

Specifically, while the first steering ECU ($ECU_{e1}$) 22 is normal, the first steering ECU ($ECU_{e1}$) 22 is used to drive the EPS steering motor 21. However, if an error occurs in the first steering ECU ($ECU_{e1}$) 22, the second steering ECU ($ECU_{e2}$) 22', instead of the first steering ECU ($ECU_{e1}$) 22 operates to drive the EPS steering motor (Me) 21.

However, in the above-described EPS steering device, the second steering ECU ($ECU_{e2}$) 22' is needed only when a failure occurs in the first steering ECU ($ECU_{e1}$) 22 and, in some cases, the second steering ECU ($ECU_{e2}$) 22' may not be used until the vehicle is discarded.

Meanwhile, in addition to the direct steering function, a steering-related additional function may be provided for adjusting the position of the steering wheel according to the size or position of the driver's body.

As an example, as illustrated in FIG. 1, there may be used a steering wheel tilt device that adjusts the height of the steering wheel (i.e., vertical position) by adjusting the inclination of the steering column to which the steering wheel is connected and a telescopic device that adjusts the front and rear positions of the steering wheel by adjusting the length of the steering column. For another steering-related additional function, a steering wheel hide device for hiding the steering wheel may be included in the autonomous vehicle.

These devices may be referred to as steering-related additional devices. The steering wheel tilt device may include a tilt motor ($M_{t1}$) 31 for adjusting the angle of the steering column and a tilt ECU ($ECU_{t1}$) 32 for controlling the tilt motor (Ma) 31. Further, the steering wheel telescopic device may include a telescopic motor ($M_{t2}$) 33 for adjusting the length of the steering column and a telescopic ECU ($ECU_{t2}$) 34 for controlling the telescopic motor ($M_{t2}$) 33. Likewise, the steering wheel hide device may also include a separate motor and a separate ECU.

As such, the entire steering-related system of the vehicle includes two or more ECUs for EPS steering, and need separately include as many additional ECUs as proportional to the steering-related additional functions. Accordingly, the number of ECUs to be provided in the entire steering-related system of the vehicle increases, causing a further complicated structures and disadvantages in terms of cost.

Accordingly, in the overall steering-related system including the steering-related additional devices and the EPS steering device, there is a need to simplify the structure of the entire system while providing a fail-safe function of the EPS steering device.

In the disclosure, although the description focuses primarily on the tilt and telescopic motors as additional motors, the above-described steering wheel hide motor and a reaction force motor in the steer-by-wire (SBW) system, and the like may be included as well.

Figure 2:
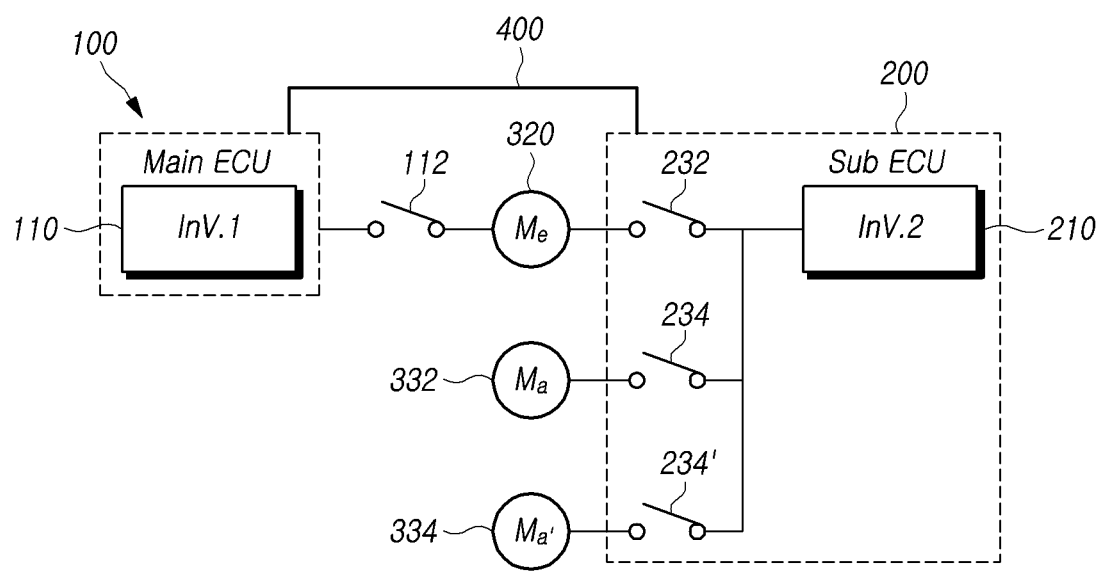
FIG. 2 is a block diagram illustrating an overall configuration of a steering system according to an embodiment.

FIG. 2 is a block diagram illustrating an overall configuration of a steering system according to an embodiment.

Referring to FIG. 2, according to an embodiment, a vehicle steering system may include an EPS steering motor (Me) 320 connected with a first inverter 110 and a second inverter 210, additional motors 332 and 334 connected with the second inverter 210 to provide steering-related additional functions, a main ECU 100 including the first inverter 110 and controlling the EPS steering motor 320 via the first inverter, and a sub ECU 200 including the second inverter.

The sub ECU 200 may control at least one of the EPS steering motor 320 or the additional motors 332 and 334 through the second inverter 210 based on at least one of main ECU state information or vehicle driving state information. For example, when the main ECU 100 operates normally, the sub ECU 200 may control the additional motors (Ma and Ma') 332 and 334 through the second inverter 210 and, if an error or failure occurs in the main ECU, the sub ECU 200 may control the EPS steering motor 320 through the second inverter 210.

In other words, according to the embodiment of FIG. 2, when the main ECU state information indicates a normal state, if a control signal for the additional motors 332 and 334 is input, the sub ECU 200 may control the operation of the additional motors 332 and 334 through the second inverter 210. In this case, the additional motors may include a tilt motor (Ma) 332 for a tilting function of the steering column and a telescopic motor (Ma') 334 for a telescopic function of the steering column, but embodiments of the disclosure are not limited thereto.

The sub ECU 200 may include a second switching unit 232 disposed between the second inverter 210 and the EPS steering motor 320 and a third switching unit disposed between the second inverter 210 and the additional motors 332 and 334. As illustrated in FIG. 2, a 3-1th switch 234 of the third switching unit is disposed between the second inverter 210 and the tilt motor Ma, which is one of the additional motors, and is turned on/off by the control of the sub ECU, controlling the application of the supply current from the second inverter 210 to the tilt motor Ma. A 3-2th switch 234' of the third switching unit is disposed between the second inverter 210 and the telescopic motor Ma', which is one of the additional motors, and is turned on/off by the control of the sub ECU, controlling the application of the supply current from the second inverter 210 to the telescopic motor Ma'.

For example, if the main ECU 100 is in a normal state, the sub ECU 200 turns off the second switching unit 232 and turns on the third switching unit 234 and 234', allowing the control current from the second inverter 210 to be applied to the additional motors (Ma and Ma'). Therefore, the additional motors 332 and 334 may be simultaneously controlled using the sub ECU 200 as well as the control of the main ECU 100.

If the state information for the main ECU indicates an abnormal state, the sub ECU 200 turns off the switching unit 112 located between the first inverter 110 and the EPS steering motor 320. And the sub ECU 200 may control the EPS steering motor 320 and control the operation of the additional motors 332 and 334 based on the vehicle driving state information.

For example, the sub ECU 200 controls the EPS steering motor through the second inverter 210 when the main ECU state information indicates an abnormal state. In this case, an operation for switching the right to control the EPS steering motor between the main ECU 100 and the sub ECU 200 is performed. In this case, if a control signal for the additional motors 332 and 334 is input, the sub ECU 200 controls the operation of the additional motors only when the vehicle speed information included in the vehicle driving state information indicates a preset speed or less. For example, while the vehicle parks, the main ECU 100 is in an abnormal state so that the sub ECU 200 controls the EPS steering motor 320 but, in light that it is less likely to perform substantial steering, may be used to control the additional motors 332 and 334 through the control of the switching units.

As described above, the additional motors may include at least one of a tilt motor for the tilt function of the steering column, a telescopic motor for the telescopic function of the steering column, and a reaction force motor and steering wheel hide motor included in the steering wheel-side assembly constituting a steer-by-wire (SBW) steering device.

Although not illustrated, the steering system according to an embodiment may further include an abnormality detector that detects an abnormality in the main ECU. The abnormality detector may measure the input/output voltage or current of the EPS steering motor and compare the value with a steering torque command or a reference value, thereby identifying whether the main ECU is operating normally. For example, the abnormality detector may be implemented with, e.g., a shunt resistor connected to the motor output line, and measure the voltage or current across the shunt resistor and compare it with a reference value or a voltage/current value corresponding to a target steering torque command. However, embodiments of the disclosure are not limited thereto.

The main ECU 100 and the sub ECU 200 may be connected through an in-vehicle communication network 400, and the sub ECU 200 may monitor the signal transmitted from the main ECU 100 and, based on the result of monitoring, determine the main ECU state information. For example, the main ECU 100 may periodically transmit a flag signal and, when the flag signal is not received at a preset period, the sub ECU 200 may determine that the main ECU 100 is in an abnormal state. The main ECU 100 may transmit a signal for informing that an abnormality occurs to the sub ECU 200, and the sub ECU 200 may receive the signal to obtain main ECU state information.

The sub ECU 200 may determine whether the second inverter 210 is in a normal state using a control signal for the additional motor. For example, when power is applied to the vehicle, the sub ECU 200 may check the state of the second inverter 210 and the sub ECU 200 including the second inverter 210. If a control signal for the additional motors is input according to the driver's input signal, the sub ECU 200 may control the additional motors 332 and 334 to identify the state information for the second inverter 210 or the sub ECU 200 including the second inverter 210. If necessary, the sub ECU 200 may transfer the sub ECU state information to the main ECU 100. The in-vehicle communication network 400 may adopt a controlled area network (CAN) communication scheme but, without limitations thereto, a separate serial communication bus may be used.

When the main ECU 100 is in an abnormal state, there may be a case in which the operation of the additional motor needs to be prioritized according to the type of the additional motor. For example, in a case where the additional motor is a steering wheel hide motor, if the main ECU 100 fails, it is impossible to secure redundancy. Therefore, the function to hide the steering wheel may stop, and the steering wheel may be back outside.

Accordingly, in the case where the additional motor is a steering wheel hide motor, if the main ECU state information indicates an abnormal state, the sub ECU may control the EPS steering motor after preferentially controlling the additional motor. Additional conditions for preferentially controlling the additional motor may be added. For example, if the sub ECU starts controlling the EPS steering motor, the sub ECU may preferentially perform the control for the additional motor when the speed of the vehicle is a preset speed or less. As another example, in the case where the sub-ECU starts controlling the EPS steering motor, if the vehicle is estimated as driving straight ahead for a certain period of time although the vehicle speed is the preset speed or more, the sub ECU may preferentially perform the control of the additional motor to allow the steering wheel to stick out to the driver's seat. Here, the predetermined period of time may be set in association with a time required to finally allow the steering wheel to stick out by controlling the steering wheel hide motor.

The sub ECU 200 may receive a sensor signal from at least one of a vehicle speed sensor or a brake sensor and determine whether the vehicle is in a stopped state based on the sensor signal.

As described above, according to an embodiment, it is possible to reduce the number of ECUs in the entire steering-related system while providing a fail-safe function of control (steering control) for the EPS steering motor. It is thereby possible to reduce the cost of the steering system and simplify its structure.

Figure 3:
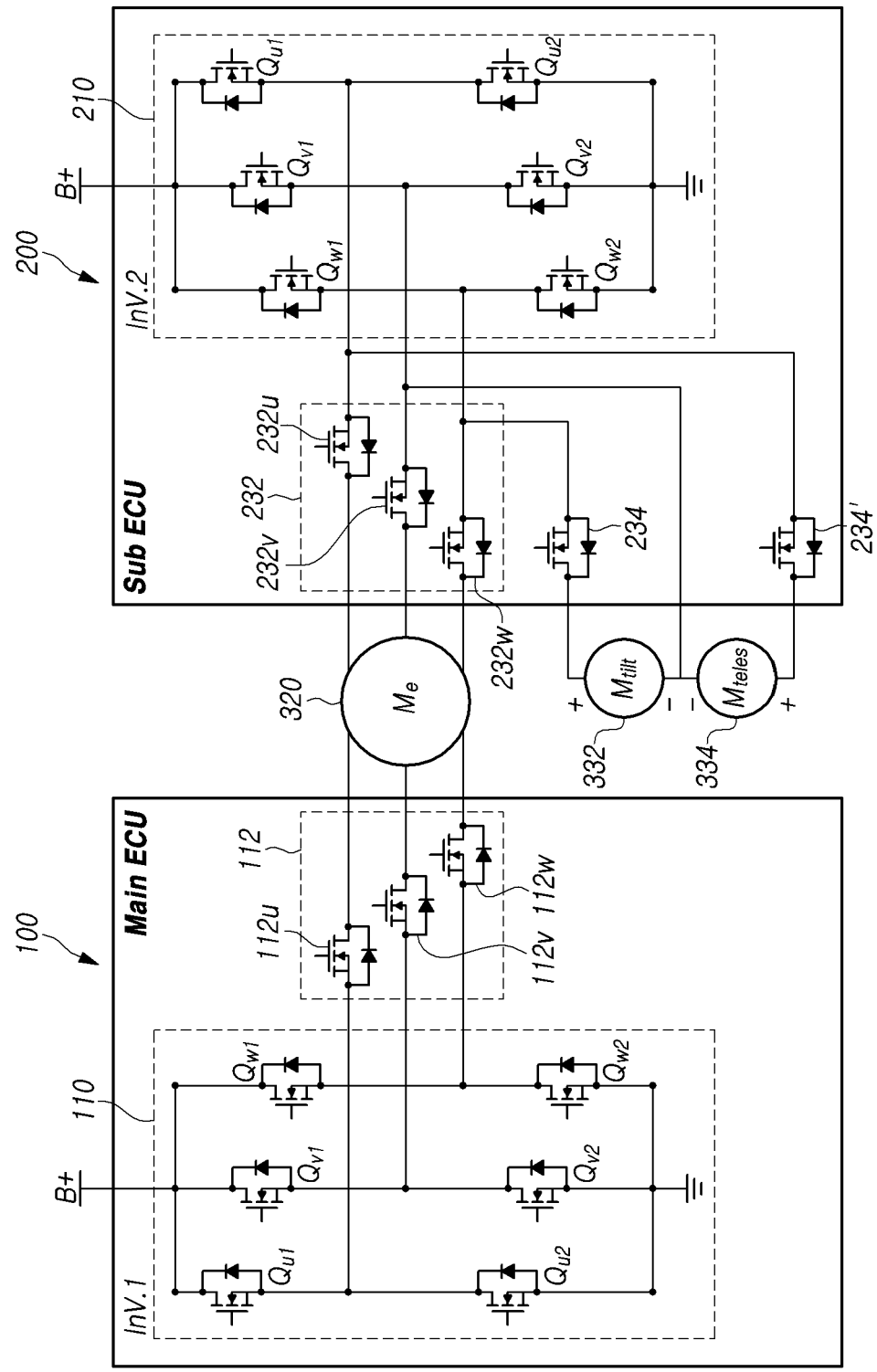
FIG. 3 is a circuit diagram illustrating a steering system according to an embodiment.

FIG. 3 is a circuit diagram illustrating a steering system according to an embodiment.

Referring to FIG. 3, according to an embodiment, a steering system may include a main ECU 100, a sub ECU 200, an ESP steering motor 320, and one or more additional motors. Although FIG. 3 illustrates an example in which a tilt motor 332 and a telescopic motor 334 are used as the additional motors, the additional motors may be replaced with motors for providing other various steering-related additional functions, such as the above-described steering wheel hide motor and reaction force motor.

Here, the EPS steering motor 320 may be a single winding motor, but the EPS steering motor 320 may be, but is not limited to, a three-phase motor driven by a three-phase control current. Although the tilt motor 332 and the telescopic motor 334, which are the additional motors, are illustrated as being direct current (DC) motors driven by DC power, embodiments of the disclosure are not limited thereto, and the additional motors may also be 3-phase motors.

The main ECU 100 may include a first inverter 110 and a first switching unit 112 disposed between the first inverter and the EPS steering motor 320. The first switching unit 112 may include three first switches 112u, 112v, and 112w to switch each of the three-phase control currents provided from the inverter to the steering motor. Although not illustrated, the main ECU 100 may further include a power switch (not shown) for controlling the application of power from a power supply (not shown), e.g., a battery, to the first inverter or a separate controller or micro control unit (MCU) for controlling the above-described first switching unit 112.

The first inverter 110 may convert the supply voltage of the battery, which is direct current (DC) voltage, to alternating current (AC) voltage or may apply AC voltage (or AC current) to the steering motor. Specifically, the first inverter 110 may convert the supply voltage of the battery into AC voltage or current and apply the AC voltage or current to each phase of the steering motor. Specifically, the first inverter 110 may be implemented as a bridge circuit including six switches disposed at both ends of the power source. For example, the bridge circuit may be an H-bridge circuit in which an upper u-current field effect transistor (FET) ($Q_{u1}$) and a lower u current FET ($Q_{u2}$), an upper v current FET ($Q_{v1}$) and a lower v current FET ($Q_{v2}$), and an upper w current FET ($Q_{w1}$) and a lower w current ($Q_{w2}$) FET disposed between the high voltage power side (+B) and the ground are connected in parallel. The upper u current FET ($Q_{u1}$) and lower u current FET ($Q_{u2}$) line is connected to a u-phase first switch 112u of the first switching unit 112, and the FET lines for the remaining v and w phases, respectively, are connected to v and w phase first switches 112v and 112w of the first switching unit 112.

The main ECU 100 controls the switch on/off of the first inverter 110 according to the steering torque measured by a torque sensor or a target torque value transmitted from a domain control unit, thereby allowing the target steering control current to be applied to the EPS steering motor 320.

The sub ECU 200 may include a second inverter 210, a second switching unit 232 disposed between the second inverter 210 and the EPS steering motor 320, and a third switching unit disposed between the second inverter 210 and the tilt motor 332 or telescopic motor 334 which is an additional motor The second switching unit 232 may include three second switches 232u, 232v, and 232w to switch each of the three-phase control currents provided from the second inverter to the steering motor.

The third switching unit may include a 3-1th switch 234 disposed between the second inverter 210 and the tilt motor 332 as an additional motor, and a 3-2th switch 234' disposed between the second inverter 210 and the telescopic motor 334 as an additional motor.

The three second switches 232u, 232v, and 232w of the second switching unit may be implemented as phase cut-off (PCO) FETs that switch only the current having the corresponding phase among the currents provided to the three-phase motor. The tilt motor 332 and the telescopic motor 334, which are additional motors, may be DC motors, and the 3-1th switch 234 and the 3-2th switch 234' of the third switching unit may be DC motor cut-off FETs.

As a result, the steering system may be simplified by configuring the 3-1th switch 234 and the 3-2th switch 234' connecting the second inverter 210 and the additional motors as a single switch. Although not illustrated, the sub ECU 200 may further include a power source, a switch controller, or a micro control unit (MCU) as does the main ECU 100. Like the first inverter 110, the second inverter 210 may be implemented as a bridge circuit including six switches disposed at both ends of the power source, and no further detailed description thereof is given below.

As described above, in the structure of FIG. 3, the sub ECU 200 selectively performs a fail-safe driving function of the EPS steering motor and a control function of the additional motors according to the state (normal or abnormal) of the main ECU 100.

For example, if the main ECU 100 is in a normal state, the sub ECU 200 may turn off the second switching unit 232 and turns on the third switching unit 234 and 234' according to an additional motor control signal from the driver, allowing the control current from the second inverter 210 to be applied to the additional motors and thereby controlling the additional motors.

If the sub ECU 200 determines that an abnormality occurs in the main ECU 100 as a result of its own monitoring or if the sub ECU 200 receives a message indicating that an abnormality occurs from the main ECU or an external abnormality detector, the sub ECU 200 may take over the right to control the EPS steering motor from the main ECU and perform the fail-safe driving function for the EPS steering motor.

Figure 4:
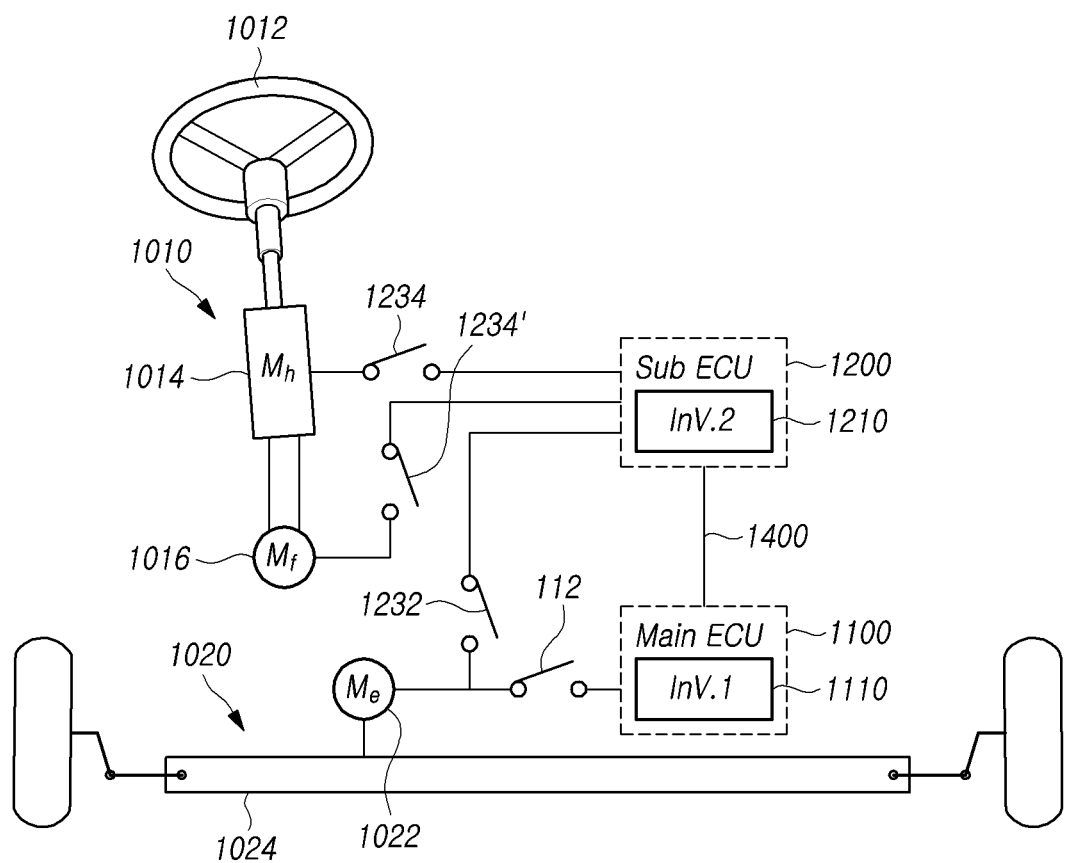
FIG. 4 is a view illustrating a configuration of a steering system according to an embodiment.

FIG. 4 illustrates a configuration of a steering system according to another embodiment, and exemplifies a case where it is applied to a steering-by-wire (SBW)-type steering device.

The SBW steering device according to the embodiment of FIG. 4 includes a steering wheel-side assembly 1010 and a driving-side assembly 1020, and the steering wheel-side assembly 1010 and the driving-side assembly 1020 are mechanically separated from each other. In addition to the steering wheel 1012 and the steering column, the steering wheel-side assembly 1010 may include a reaction force motor (MO 1016 for providing a steering feel (e.g., vibration) according to steering to the steering wheel. Further, in the case of an autonomous vehicle, the steering wheel-side assembly 1010 may further include a steering wheel hide motor (Mh) 1014 for hiding the steering wheel 1020 during autonomous driving. The steering wheel hide motor 1014 may be used to adjust the length of the steering column and change the shape of the steering wheel to thereby provide a steering wheel hide function.

In the embodiment of FIG. 4, the reaction force motor 1014 and the steering wheel hide motor 1016 are additional motors. In other words, the steering-related additional functions described in the disclosure may be a function for providing reaction force in the SBW steering device and a function for hiding the steering wheel during autonomous driving.

The driving-side assembly 1020 of the SBW steering device illustrated in FIG. 4 may include an EPS steering motor 1022 for SBW steering which is interlocked with, e.g., the rack bar 1024 via, e.g., a rack screw device, and a main ECU 1100 for controlling the same.

Specifically, the steering system of FIG. 4 may include an EPS steering motor (Me) 1022 connected to a first inverter 1110 and a second inverter 1210, a reaction force motor (Mf) 1016 and/or a steering wheel hide motor (Mh) 1014, as additional motors, connected to the second inverter 1210, a main ECU 1100, and a sub ECU 1200.

The main ECU 1100 includes the first inverter 1110 and controls the EPS steering motor 1022 for SBW steering through a switching unit 112 disposed between the first inverter 1110 and the EPS steering motor 1022, and the first inverter 1110. The sub ECU 1200 includes the second inverter 1210. When the main ECU 1100 operates normally, the sub ECU 1200 controls the reaction force motor 1016 and/or the steering wheel hide motor 1014 through the second inverter 1210 and, when the main ECU 1100 is abnormal, controls the EPS steering motor 1022 through the second inverter 1210.

The sub ECU 1200 may include a second switching unit 1232 disposed between the second inverter 1210 and the EPS steering motor 1022 and a third switching unit disposed between the second inverter 1210 and the reaction force motor 1016 and/or the steering wheel hide motor 1014.

A 3-1th switch 1234 of the third switching unit is disposed between the second inverter 1210 and the steering wheel hide motor 1014, which is one of the additional motors, and is turned on/off by the control of the sub ECU, controlling the application of the supply current from the second inverter 1210 to the steering wheel hide motor 1014.

A 3-2th switch 1234' of the third switching unit is disposed between the second inverter 1210 and the reaction force motor 1016, which is one of the additional motors, and is turned on/off by the control of the sub ECU, controlling the application of the supply current from the second inverter 1210 to the reaction force motor 1016.

Hereinafter, since the detailed circuit configuration of the steering system according to the embodiment of FIG. 4 and the operation of the ECU are the same as those of FIG. 3, no duplicate description thereof is given below. However, as the steering wheel hide motor has a difference in importance from the tilt or telescopic motor, if a failure occurs in the main ECU, the steering wheel hide motor may be controlled before the EPS steering motor depending on the driving state of the vehicle or whether the vehicle drives straight for a predetermined period of time as described above.

As another example, the additional motor may be connected to the first inverter as well. In other words, the additional motor may be connected to both the first inverter and the second inverter. In this case, as described above, the main ECU preferentially performs the control of the EPS steering motor and, if the main ECU is in a normal state, the sub ECU preferentially performs the control of the additional motor.

However, if the main ECU is in an abnormal state, the sub ECU may control the EPS steering motor while the main ECU may control the additional motor, depending on the type of the abnormal state. For example, the abnormal state of the main ECU may be divided into a failure in the first inverter circuit and a failure in the switching unit connecting the first inverter and the EPS steering motor. If the abnormal state is a failure in the switching unit, the control of the EPS steering motor through the main ECU may encounter an issue, but the control of the additional motor through the first inverter circuit may be performed normally. Accordingly, the main ECU may transfer the right to control the EPS steering motor to the sub ECU and receive the right to control the additional motor from the sub ECU and control the additional motor. If a problem occurs in a switching element that is not used to control the additional motor although the first inverter circuit is in a failure state, the main ECU may likewise control the additional motor.

The above-described steering system is briefly described again in light of its operations.

Figure 5:
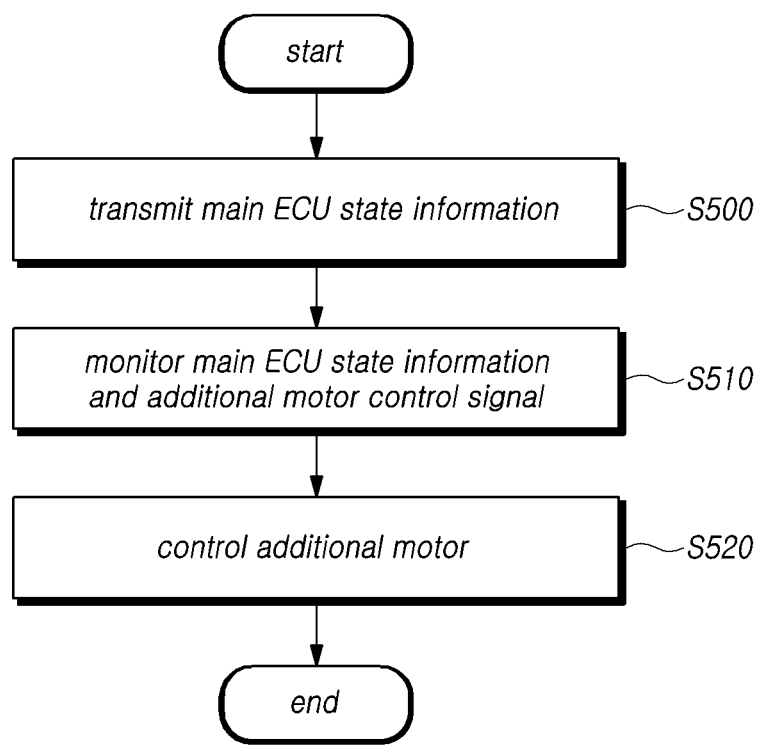
FIG. 5 is a flowchart illustrating an overall method for controlling a steering system according to an embodiment.

FIG. 5 is a flowchart illustrating an overall method for controlling a steering system according to an embodiment.

Referring to FIG. 5, in the steering system for controlling the EPS steering motor and the additional motors that provide steering-related additional functions, the main ECU including the first inverter may control the EPS steering motor through the first inverter and transmit main ECU state information (S500).

As described above, the main ECU may control the EPS steering motor in a normal state. The main ECU may transfer the state information to the sub ECU periodically or when an event occurs.

In the steering system, the sub ECU including the second inverter may monitor the main ECU state information and a control signal for the additional motor (S510).

For example, the sub ECU may monitor the state information for the main ECU through the in-vehicle communication network. The sub ECU may monitor the control signal for controlling the additional motor and control the additional motor. The sub ECU may receive various pieces of sensor information from, e.g., a vehicle speed sensor and a brake sensor configured in the vehicle.

In the steering system, if the control signal for the additional motor is input, the sub ECU may control the additional motor through the second inverter based on at least one of the main ECU state information and vehicle driving state information (S520).

For example, when the main ECU state information indicates a normal state, the sub ECU may control the additional motor based on the control signal for the additional motor. As another example, if the main ECU state information indicates an abnormal state, the sub ECU may control the EPS steering motor and control the operation of the additional motor based on the vehicle driving state information. As another example, if the main ECU state information indicates an abnormal state, the sub ECU may control the operation of the additional motor only when the vehicle speed information included in the vehicle driving state information indicates a preset speed or less. As another example, in the case where the additional motor is a steering wheel hide motor, if the main ECU state information indicates an abnormal state, the sub ECU may control the EPS steering motor after preferentially controlling the additional motor. In this case, as described above, the sub-ECU may determine whether to preferentially control the steering wheel hide motor by further using at least one of the vehicle speed information or a result of determining whether the route is a straight driving route.

The steering system may determine whether the second inverter is in a normal state using the control signal for the additional motor after controlling the additional motor and transfer a result of determination of whether the second inverter is in a normal state to the main ECU through the in-vehicle communication network.

The method for controlling the steering system may further include other various steps necessary to perform the control of the steering system, and the steps may be performed separately or in combination as necessary. The steps may be performed in a different order depending on a specific condition or state.

Figure 6:
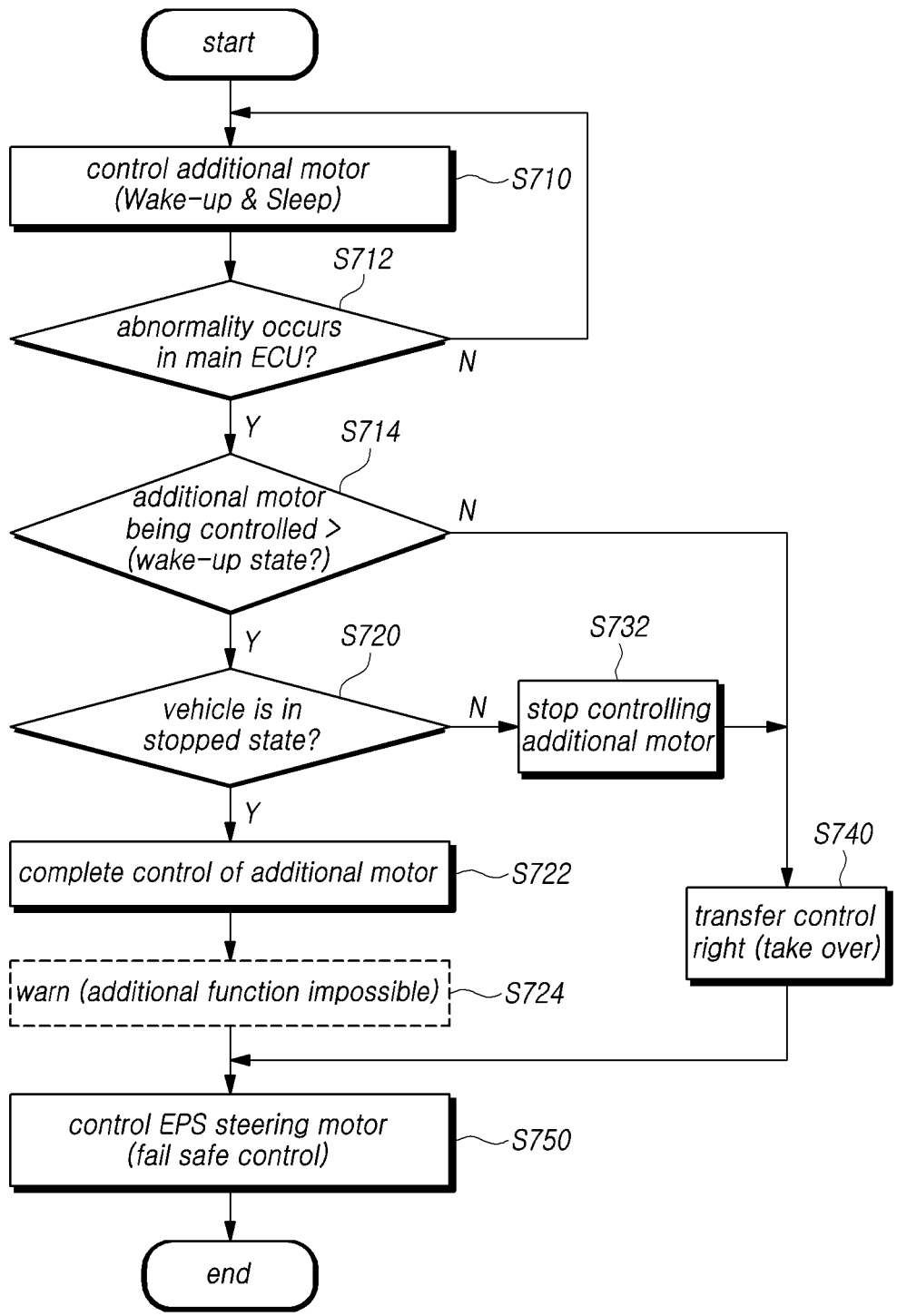
FIG. 6 is a flowchart illustrating detailed operations of a sub ECU according to an embodiment.

FIG. 6 is a flowchart illustrating detailed operations of a sub ECU according to an embodiment.

Referring to FIG. 6, the sub ECU controls the additional motor through the second inverter to provide a steering-related additional function when the main ECU is in a normal state (S710). In this case, if an additional motor operation command is input from the outside, the sub ECU may wake up and control the additional motor and, if the control of the additional motor is complete, the sub ECU may switch to the sleep state.

The sub ECU may determine whether the main ECU is in an abnormal state (S712) and, if an abnormality occurs in the main ECU (Y in S712), determine whether it is controlling the additional motor at the time (S714).

If it is controlling one or more additional motors at the time when an abnormality occurs in the main ECU (Y in S714), the sub ECU determines whether the vehicle is in a stopped state based on sensor information from, e.g., a vehicle speed sensor or a brake sensor (S720).

If the vehicle is in a stopped state (Y in S720), the control of the additional motor which is being performed continues and, after the control of the additional motor is complete, the sub ECU takes over the right to control the EPS steering motor from the main ECU and performs the fail-safe control on the EPS steering motor (S722, S724).

In this case, a warning signal indicating that additional control of the additional motor is impossible may be generated and output (S724). In other words, if the sub ECU happens to control the EPS motor (fail-safe control) instead of the control of the additional motor, which is its own function, the sub ECU may inform the driver that the corresponding additional function (steering wheel tilting/telescoping, providing SBW reaction force, or hiding the steering wheel) may not be provided in the future.

On the other hand, when the vehicle is not in the stopped state (N in S720), the sub ECU immediately stops controlling the additional motor and receives the right to control the EPS steering motor from the main ECU and performs fail-safe control of the EPS steering motor (S732, 5740, and S750).

As described above, the use of the method for controlling a steering system according to an embodiment may render it possible to secure redundancy of EPS steering control using fewer ECUs while seamlessly providing steering-related additional functions (e.g., steering wheel tilting/telescoping, providing SBW reaction force, or hiding the steering wheel).

Described below is another steering system to which embodiments of the disclosure may be applied.

Figure 7:
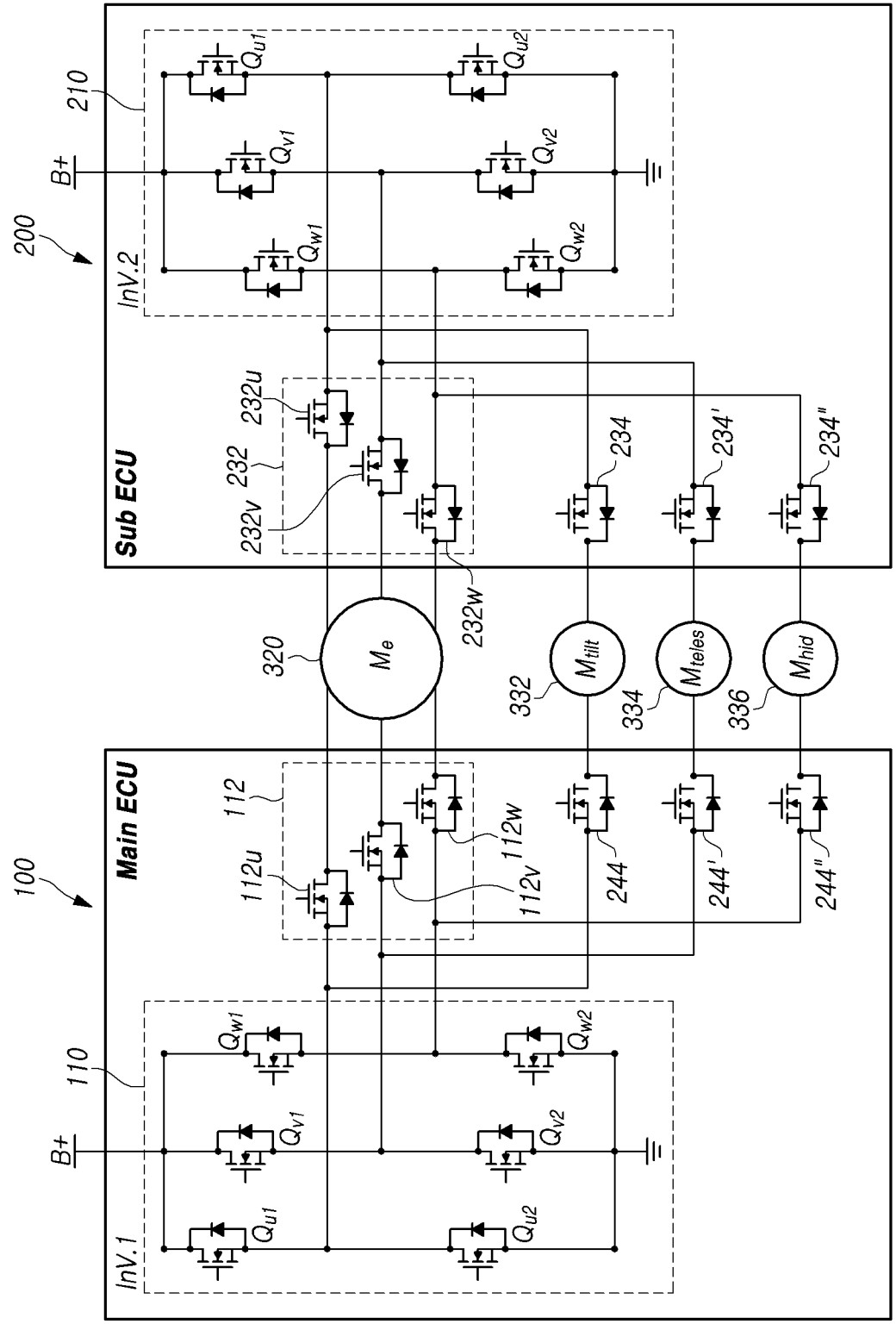
FIG. 7 is a view illustrating a configuration of a steering system according to an embodiment.

FIG. 7 is a view illustrating a configuration of a steering system according to an embodiment.

Referring to FIG. 7, a steering system may include an EPS steering motor 320 connected to a first inverter 110 and a second inverter 210, additional motors 332, 334, and 336 connected to the first inverter 110 and the second inverter 210 to provide steering-related additional functions, a main ECU 100 including the first inverter 110 and controlling the EPS steering motor 320 and the additional motors 332, 334, and 336 through the first inverter 110, and a sub ECU 200 including the second inverter 210 and controlling the EPS steering motor 320 and the additional motors 332, 334, and 336 through the second inverter 210. Only any one of the EPS steering motor 320 and the additional motors 332, 334, and 336 may be controlled according to a preset condition.

As illustrated in FIG. 7, up to three additional motors may be connected and controlled by the main ECU 100 and the sub ECU 200. For example, the EPS steering motor 320 may be a dual winding motor, and the windings are controlled by the main ECU 100 and the sub ECU 200, respectively. Accordingly, the EPS steering motor 320 may provide 50% of the output by the main ECU 100 and 50% of the output by the sub ECU 200. Therefore, even when any one of the ECUs is in an abnormal state, redundancy may be secured through the output of 50%.

However, unlike in the above-described embodiments, in the present steering system, the main ECU 100 and the sub ECU 200 simultaneously control the EPS steering motor 320 and, thus, control of the additional motors 332, 334, and 336 may occur in a situation where the EPS steering motor 320 is not controlled.

As an example, the preset condition may be set to control only one of the EPS steering motor and the additional motors based on at least one of vehicle driving state information or additional motor type information. For example, the condition may be set to perform the control of the additional motor when the vehicle parks, through the vehicle driving state information. A different condition may be set depending on whether the additional motor is a tilt motor, a telescopic motor, or a steering wheel hide motor.

As an example, the preset condition may be set to stop controlling the additional motor if the vehicle is determined to park based on the vehicle driving state information. As the control of the EPS steering motor needs to be performed when the vehicle travels, the condition may be set to disregard a control input signal for the additional motor.

As an example, the preset condition may be set to allow control of the additional motor if it is determined that the vehicle is in a stopped state. Since no control of the EPS steering motor may be necessary while the vehicle parks, the condition may be set to allow control of the additional motor only in such a case.

As an example, the preset condition may be set further considering state information for the main ECU and the sub ECU and may be set to stop controlling the additional motor if it is determined that at least one of the main ECU or the sub ECU is in an abnormal state. For example, if either the main ECU or the sub ECU is in an abnormal state, the EPS steering motor is controlled by the ECU which is in the normal state. Therefore, the EPS steering motor may have higher priority so that no control is allowed on the additional motor until the ECU which is in the abnormal state turns back to the normal state. By that way, safety may be secured.

As an example, the preset condition may be set to allow control for the additional motor when the driving speed of the vehicle is a preset vehicle speed or less and the vehicle is driving straight if the additional motor is a steering wheel hide motor according to the additional motor type information. For example, normal control is carried out if the additional motor is a tilt motor or a telescopic motor, and the vehicle parks. In contrast, a steering wheel hide motor allows the operation of hiding or sticking out the steering wheel to be performed even when the vehicle, e.g., an autonomous vehicle, is running. Thus, in the case where the type of the additional motor to be controlled is a steering wheel hide motor, the condition may be set to allow control for a predetermined time in the straight-driving situation where the vehicle speed is a predetermined speed or less, and an input to the EPS steering motor is less likely.

The preset condition may be set to preferentially perform the control on the steering wheel hide motor under a specific condition if it is determined that either the main ECU or the sub ECU is in an abnormal state. For example, the specific condition may be a condition where it is determined that the vehicle speed is a predetermined speed or less and the vehicle drives straight. When any one of the ECUs is recognized as being in an abnormal state, this indicates a situation where no redundancy has been secured for the EPS steering motor of the vehicle and, thus, the steering wheel may be required to mechanically stick out. Thus, in a case where any one of the ECUs is in an abnormal state, the steering wheel hide motor may be operated to stick out the steering wheel automatically or by a manual input under the afore-mentioned specific condition.

Other various modifications may be made to the preset condition experimentally or for the user's convenience.

The operation of controlling an additional motor in the steering system structure of FIG. 7 described above is briefly described below with reference to the drawings.

Figure 8:
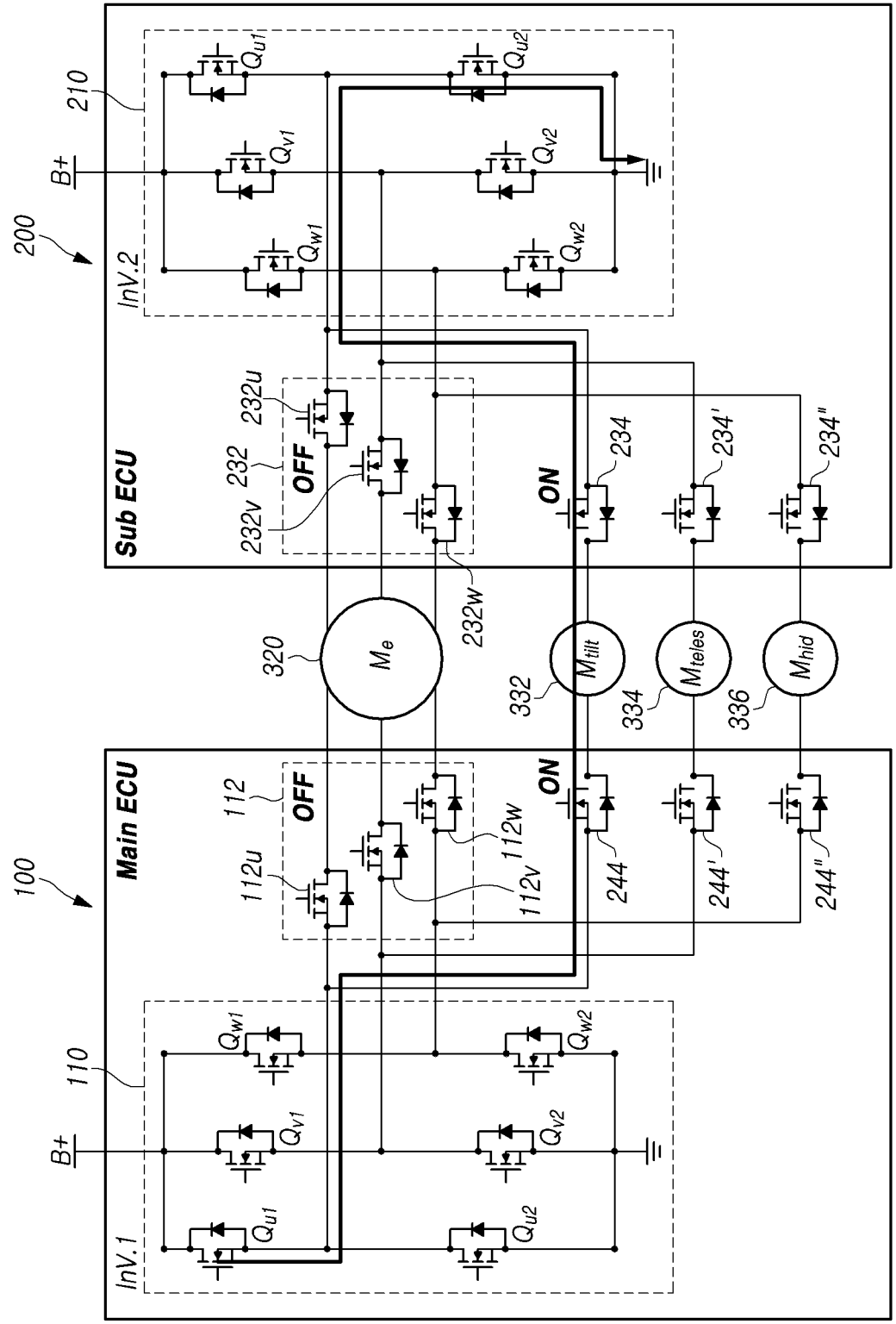
FIGS. 8, 9, and 10 are views illustrating a flow of additional motor control signals in a steering system according to an embodiment.
Figure 9:
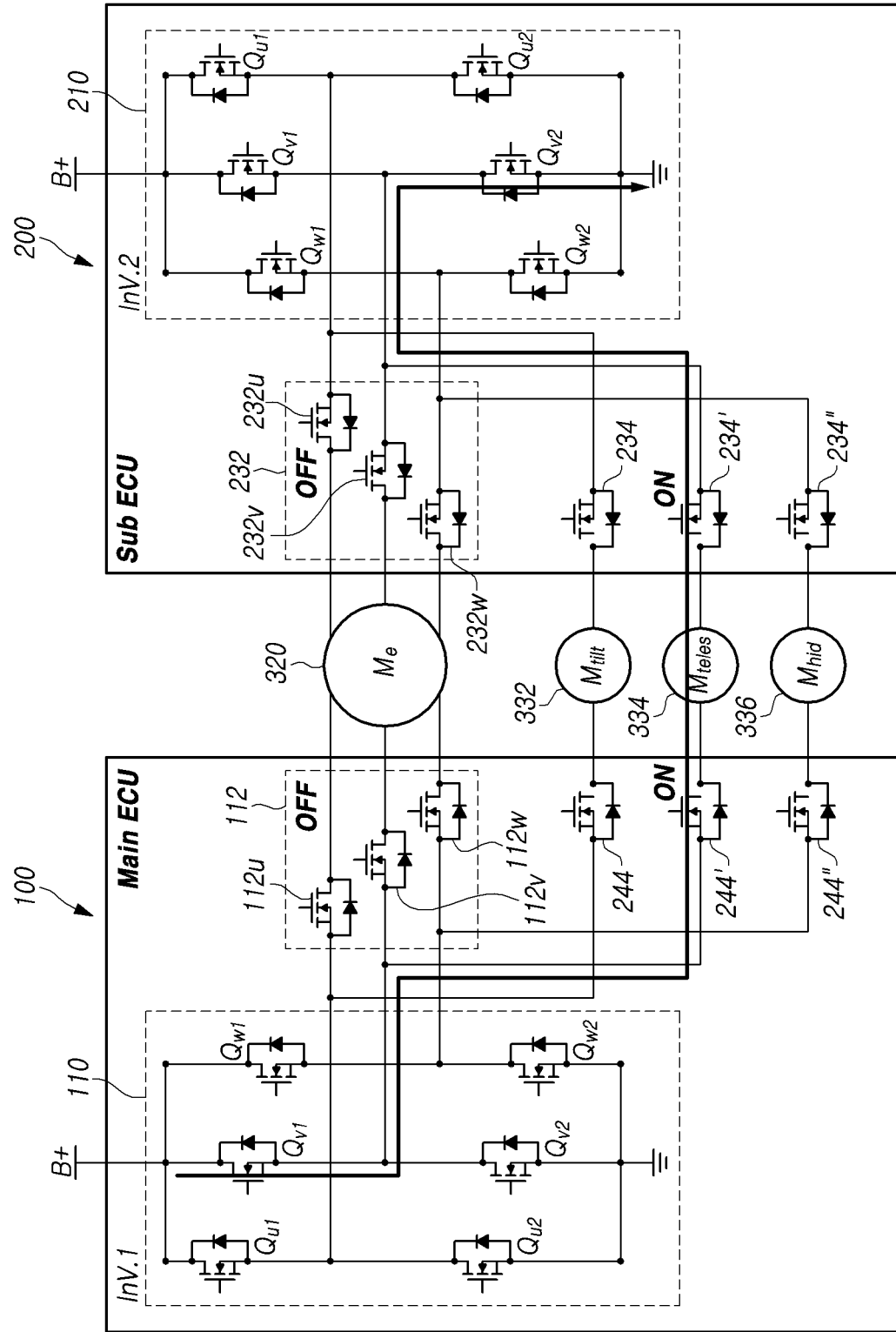
Figure 10:
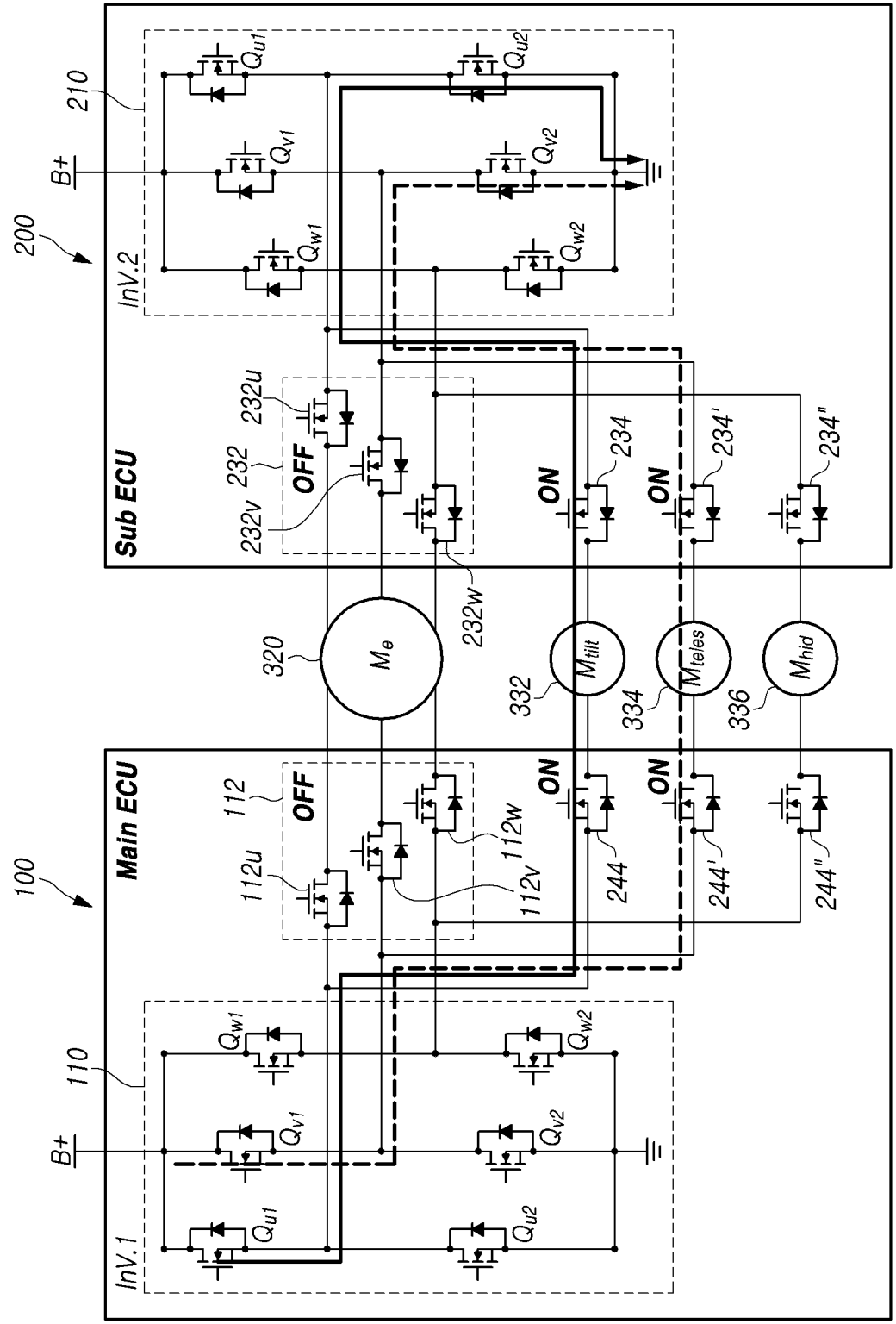

FIGS. 8, 9, and 10 are views illustrating a flow of additional motor control signals in a steering system according to an embodiment.

Referring to FIG. 8, if a control signal for the tilt motor 332 is input, the switching units 112 and 232 for the EPS steering motor 320 all switch off. The switch Qu1 of the first inverter 110, which is connected to the tilt motor 332, turns on, and the tilt motor switch 244 of the main ECU 100 turns on. Likewise, the tilt motor switch Qu2 and the tilt motor switch 234 of the second inverter 210 of the sub ECU 200 turn on. In this case, no control is performed on the EPS steering motor 320.

Similarly, referring to FIG. 9, if a control signal for the telescopic motor 334 is input, the switching units 112 and 232 for the EPS steering motor 320 all switch off. The switch Qv1 of the first inverter 110, which is connected to the telescopic motor 334, turns on, and the telescopic motor switch 244' of the main ECU 100 turns on. Likewise, the telescopic motor switch Qv2 and the telescopic motor switch 234' of the second inverter 210 of the sub ECU 200 turn on. In this case, no control is performed on the EPS steering motor 320.

Similar operations to those of FIGS. 8 and 9 may be performed on the steering wheel hide motor 336.

As illustrated in FIG. 10, at least two of the additional motors may be simultaneously controlled.

Referring to FIG. 10, when the tilt motor 332 and the telescopic motor 334 are simultaneously controlled, the switches connected to the motors are turned on, and the switching units 112 and 232 of the EPS steering motor are turned off. Therefore, the driver may simultaneously control at least two additional motors.

Figure 11:
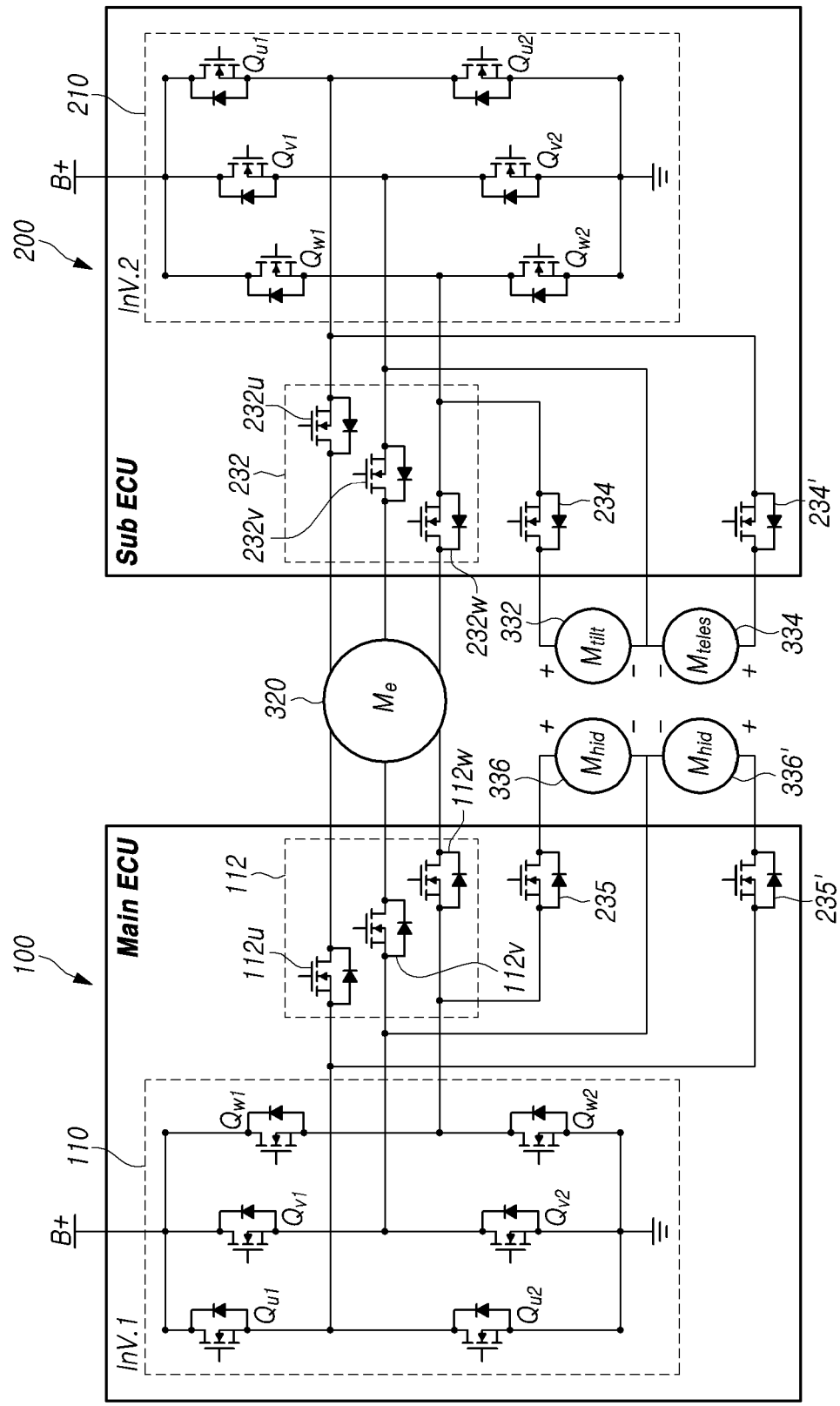
FIG. 11 is a view illustrating a configuration of a steering system according to an embodiment.

FIG. 11 is a view illustrating a configuration of a steering system according to an embodiment.

Referring to FIG. 11, there may be provided a steering system having a structure in which additional motors 332 and 334 are connected to a sub ECU 200, and a main ECU 100 first controls an EPS steering motor 320 as illustrated in FIG. 3. More additional motors 336 and 336' may also be connected to the main ECU 100. The types of additional motors connected to the main ECU 100 and the sub ECU 200 may be mutually changed. Alternatively, they may be connected in various combinations.

For example, the main ECU 100 may control the additional motors 332 and 334 connected to the sub ECU 200 while simultaneously controlling the EPS steering motor 320. Further, as described above, although the sub ECU 200 controls the EPS steering motor 320 when the main ECU 100 is in an abnormal state, if the abnormality is of the type in which the additional motors 336 and 336' connected to the main ECU 100 are controllable, the main ECU 100 may be used for the purpose of controlling the additional motors. For example, if a failure occurs in the switching unit 112 of the main ECU 100, the EPS steering motor 320 may not be controlled, but the control of the additional motors 336 and 336' may be performed simultaneously with the operation of controlling the EPS steering motor 320 by the sub ECU 200.

Even when a failure occurs in a specific switch of the first inverter 100 of the main ECU 100, and the switch does not play a role to control the additional motor, the right to control the EPS steering motor 320 is transferred, but the control of the additional motors 336 and 336' may simultaneously be carried out.

In a case where the EPS steering motor 320 in the steering system of FIG. 11 is a dual winding motor as illustrated in FIG. 7, the additional motor and the EPS steering motor may be simultaneously controlled in FIG. 11, unlike in FIGS. 7 to 10.

For example, if a specific condition is met although the main ECU 100 and the sub ECU 200 control the EPS steering motor 320, the control of the additional motor may be simultaneously performed. As an example, if such a specific condition where the steering wheel hide motors 336 and 336' are required to be first controlled is met, the sub ECU 200 may temporarily control the EPS steering motor 320 by 50% of the output through one of the windings while the main ECU 100 may temporarily control the additional motors 336 and 336' and then control the EPS steering motor 320.

By the above-described operations, it is possible to secure redundancy for the EPS steering motor and increase safety while simultaneously or sequentially controlling various additional motors.

Figure 12:
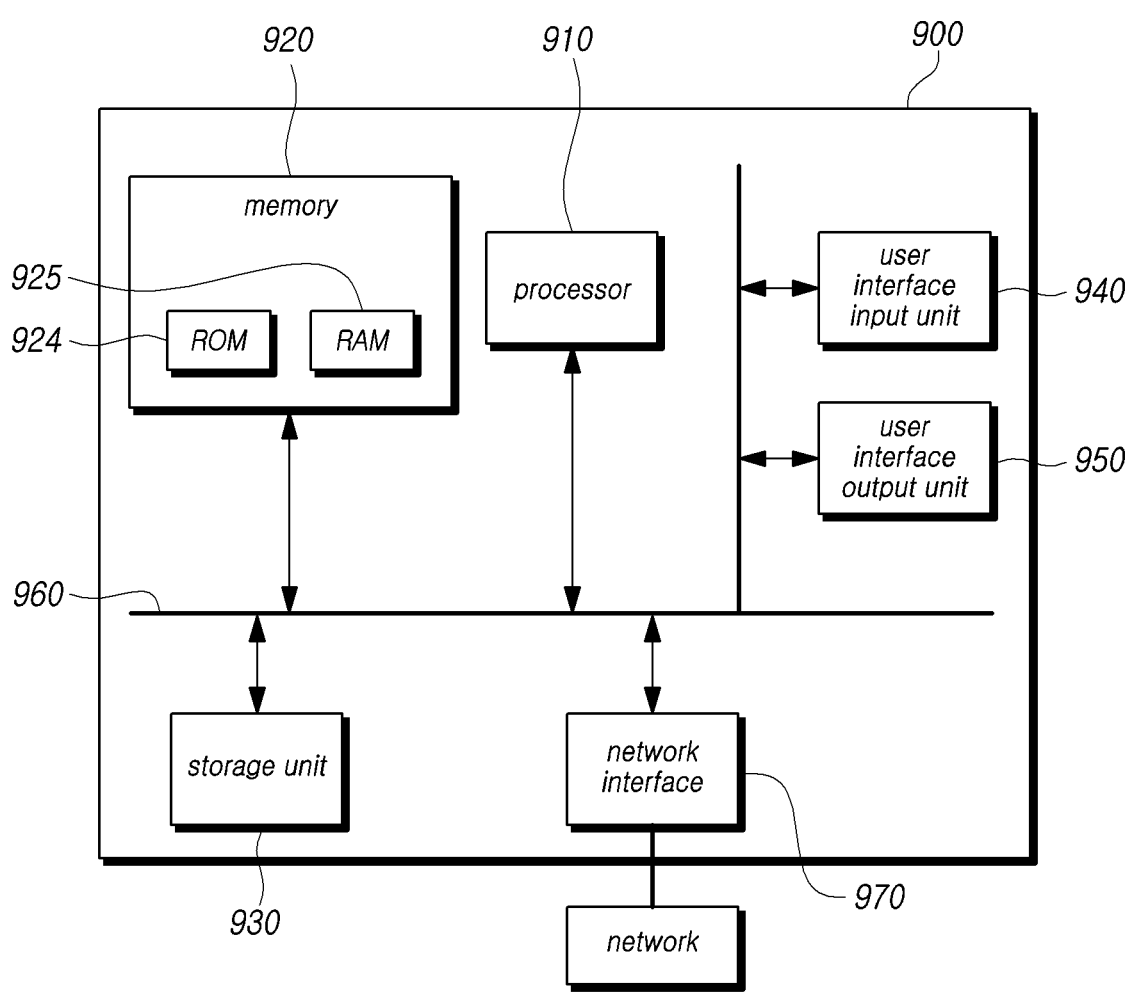
FIG. 12 is a view illustrating an example hardware configuration of a main ECU or a sub ECU according to an embodiment.

FIG. 12 is a block diagram showing an example of the hardware configuration of the main ECU or sub ECU.

Referring to FIG. 12, the steering system according to the above-described embodiments, the main ECU and sub ECU included therein, or the MCU included therein may be implemented as, e.g., a computer-readable recording medium, in a computer system.

As illustrated in the drawings, the computer system 900 of main ECU and sub ECU may include at least one of one or more processors 910, a memory 920, a storage unit 930, a user interface input unit 940, and a user interface output unit 950 which may communicate with each other via a bus 960.

The computer system 900 may further include a network interface 970 for connecting to a network. The processor 910 may be a central processing unit (CPU) or semiconductor device that executes processing instructions stored in the memory 920 and/or the storage unit 930. The memory 920 and the storage unit 930 may include various types of volatile/non-volatile storage media. For example, the memory may include a read only memory (ROM) 924 and a random access memory (RAM) 925.

The main ECU and the sub ECU provided in the steering system according to this embodiment may have a hardware structure as shown in FIG. 12. In particular, the sub ECU according to this embodiment includes a software module for determining an abnormality in the main ECU, and an additional motor. A software module that generates a control signal, a software module that generates a signal to control the switching unit when an error occurs in the main ECU, and a software module that generates a signal to control the EPS steering motor when an error occurs in the main ECU can be installed. have. The processor (MCU) 910 of the sub ECU may execute a corresponding function by executing each software module stored in the storage unit 930 or the memory 920.

The main ECU and sub ECU provided in the steering system according to the present embodiment may have a hardware structure as shown in FIG. 12. In particular, the sub-ECU according to the present embodiment includes a software module that determines an abnormality in the main ECU, a software module that generates an additional motor control signal, a software module that generates a signal for controlling the switching unit when an abnormality occurs in the main ECU, A software module that generates a signal for controlling the EPS steering motor when an error occurs in the main ECU may be installed. The processor (MCU) 910 of the sub ECU may execute a corresponding function by executing each software module stored in the storage unit 930 or the memory 920.

As described above, according to the present embodiment, in the vehicle steering system, a small number of ECUs are used to secure redundancy of EPS steering control and additional functions related to steering (steering wheel tilt/tele, SBW reaction force provision, steering There is an effect that can smoothly provide the wheel hiding, etc.).

In the above, even though all the constituent elements constituting the present embodiment have been described as being combined into one or operating in combination, the present embodiment is not necessarily limited thereto. That is, as long as it is within the scope of the object of the disclosure, one or more components may be selectively combined and operated. In addition, all components may be implemented as one independent hardware. In addition, some or all of the respective components may be selectively combined to be implemented as a computer program having a program module that performs some or all of the combined functions in one or a plurality of hardware. Codes and code segments constituting a computer program may be easily inferred by a person skilled in the art. These computer programs are stored in a computer-readable storage medium, and are read and executed by the computer. Through this, the present embodiment can be implemented. The storage medium of the computer program may include a magnetic recording medium, an optical recording medium, a carrier wave medium, and the like.

In addition, terms such as "include", "consist of" or "have" described above mean that the corresponding constituent elements may be included unless otherwise specified. Therefore, it should be interpreted that other components may be further included rather than excluding other components. All terms, including technical or scientific terms, have the same meaning as commonly understood by a person of ordinary skill in the relevant technical field, unless otherwise defined. Generally used terms, such as terms defined in the dictionary, should be interpreted as being consistent with the meaning in the context of the related technology. In addition, unless explicitly defined in the disclosure, it is not interpreted in an ideal or excessively formal sense.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steering system, comprising:
  an EPS steering motor connected to a first inverter and a second inverter;
  an additional motor connected to the first inverter and the second inverter and providing a steering-related additional function;

a main ECU including the first inverter and controlling the EPS steering motor and the additional motor through the first inverter; and a sub ECU including the second inverter and controlling the EPS steering motor and the additional motor through the second inverter, wherein the EPS steering motor alone or the additional motor alone is controlled according to a preset condition.

2. The steering system of claim 1, wherein the preset condition is set to control the EPS steering motor alone or the additional motor alone based on at least one of vehicle driving state information or additional motor type information.

3. The steering system of claim 2, wherein the preset condition is set to;

stop controlling the additional motor if it is determined that a vehicle is in a driving state based on the vehicle driving state information, and allow control of the additional motor if it is determined that the vehicle is in a stopped state.

4. The steering system of claim 2, wherein both the main ECU and the sub ECU are configured to control simultaneously a steering wheel when the vehicle is in a driving state based on the vehicle driving state information.

5. The steering system of claim 4, wherein the EPS steering motor is configured to provide a portion of an output by the main ECU and a remaining portion of the output by the sub ECU when the EPS steering motor is controlled.

6. The steering system of claim 3, wherein the additional motor is a tilt motor for a steering wheel or a telescopic motor for the steering wheel.

7. The steering system of claim 2, wherein the preset condition is set further considering state information for the main ECU and the sub ECU, and wherein the preset condition is set to stop controlling the additional motor if it is determined that at least one of the main ECU or the sub ECU is in an abnormal state.

8. The steering system of claim 2, wherein the preset condition is set to allow control of the additional motor if the additional motor is a steering wheel hide motor according to the additional motor type information, and when a driving speed of a vehicle is a preset speed or less, and the vehicle drives straight.

9. The steering system of claim 1, wherein three additional motors are connected and controlled by the main ECU and the sub ECU.

10. The steering system of claim 1, wherein the EPS steering motor is a dual winding motor having two windings, and each winding of the EPS steering motor is controlled by the main ECU and the sub ECU, respectively.

11. The steering system of claim 2, wherein the additional motor is at least one of a tilt motor, a telescopic motor or a steering wheel hide motor, wherein different conditions are set depending on whether a control input signal is for the tilt motor, the telescopic motor, or the steering wheel hide motor.

12. The steering system of claim 2, wherein, if the vehicle is in a driving state based on the vehicle driving state information, the preset condition is set to disregard a control input signal for the additional motor even if the control input signal for the additional motor is input.

13. The steering system of claim 2, wherein if one of the main ECU and the sub ECU is in an abnormal state and the other one of the main ECU and the sub ECU is in a normal state, the EPS steering motor is controlled by the other one of the main ECU and the sub ECU, which is in the normal state.

14. The steering system of claim 2, wherein a control input signal is for a steering wheel hide motor, wherein the preset condition is set to preferentially perform a control on the steering wheel hide motor under a specific condition if it is determined that either the main ECU or the sub ECU is in an abnormal state.

15. The steering system of claim 14, wherein the specific condition includes a condition whether the vehicle speed is a predetermined speed or less and the vehicle drives straight.

\* \* \* \* \*